United States Patent
Novack et al.

(10) Patent No.: US 9,531,546 B2
(45) Date of Patent: *Dec. 27, 2016

(54) METHODS AND APPARATUS TO CERTIFY DIGITAL SIGNATURES

(71) Applicant: AT&T Intellectual Property I, L.P., Atlanta, GA (US)

(72) Inventors: Brian M. Novack, St. Louis, MO (US); David L. Dunmire, Roswell, GA (US); Daniel L. Madsen, Castro Valley, CA (US); Michael D. Cheaney, Arnold, MO (US); Timothy R. Thompson, O'Fallon, MO (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/636,048

(22) Filed: Mar. 2, 2015

(65) Prior Publication Data
US 2015/0172062 A1 Jun. 18, 2015

Related U.S. Application Data

(63) Continuation of application No. 14/244,876, filed on Apr. 3, 2014, now Pat. No. 8,972,735, which is a continuation of application No. 11/352,632, filed on Feb. 13, 2006, now Pat. No. 8,700,902.

(51) Int. Cl.
*H04L 9/32* (2006.01)

(52) U.S. Cl.
CPC ........... *H04L 9/3247* (2013.01); *H04L 9/3231* (2013.01); *H04L 9/3263* (2013.01)

(58) Field of Classification Search
None
See application file for complete search history.

(56) References Cited

U.S. PATENT DOCUMENTS

| | | |
|---|---|---|
| 5,757,916 A | 5/1998 | MacDoran et al. |
| 5,970,143 A | 10/1999 | Schneier et al. |
| 5,970,145 A | 10/1999 | McManis |

(Continued)

OTHER PUBLICATIONS

United States Patent and Trademark Office, "Office Action," issued in connection with U.S. Appl. No. 11/352,632, on May 27, 2009, 35 pages.

(Continued)

*Primary Examiner* — Kaveh Abrishamkar
(74) *Attorney, Agent, or Firm* — Hanley, Flight and Zimmerman, LLC.

(57) ABSTRACT

Methods and apparatus to certify digital signatures are disclosed. An example method includes retrieving, from a first database, a first geographical location associated with an identification number associated with a network device and identified in a request to certify a digital signature, comparing the first geographical location associated with the identification number to a second geographical location to verify the second geographical location, and in response to the verification of the second geographical location and to a comparison of (a) biometric information associated with a user associated with the request and (b) stored biometric information, instructing a certificate issuer to certify the digital signature to indicate an authenticity of the digital signature.

24 Claims, 4 Drawing Sheets

(56) References Cited

U.S. PATENT DOCUMENTS

| | | | |
|---|---|---|---|
| 5,996,076 | A | 11/1999 | Rowney et al. |
| 6,016,476 | A | 1/2000 | Maes et al. |
| 6,167,517 | A | 12/2000 | Gilchrist et al. |
| 6,249,873 | B1 | 6/2001 | Richard et al. |
| 6,282,658 | B2 | 8/2001 | French et al. |
| 6,308,266 | B1 | 10/2001 | Freeman |
| 6,496,595 | B1 | 12/2002 | Puchek et al. |
| 6,571,221 | B1 | 5/2003 | Stewart et al. |
| 6,651,166 | B1 | 11/2003 | Smith et al. |
| 6,655,585 | B2 | 12/2003 | Shinn |
| 6,658,414 | B2 | 12/2003 | Bryan et al. |
| 6,662,166 | B2 | 12/2003 | Pare, Jr. et al. |
| 6,763,336 | B1 | 7/2004 | Kolls |
| 6,842,449 | B2 | 1/2005 | Hardjono |
| 7,440,901 | B1 | 10/2008 | Dlott et al. |
| 7,496,752 | B2 | 2/2009 | Yamaguchi et al. |
| 7,631,186 | B2 | 12/2009 | Okabe |
| 8,090,949 | B2 | 1/2012 | Bellur et al. |
| 8,700,902 | B2 * | 4/2014 | Novack ............... H04L 9/3231 713/158 |
| 8,972,735 | B2 * | 3/2015 | Novack ............... H04L 9/3231 713/158 |
| 2001/0034836 | A1 * | 10/2001 | Matsumoto ............ G06F 21/32 713/176 |
| 2001/0054085 | A1 | 12/2001 | Kurganov |
| 2001/0055370 | A1 | 12/2001 | Kommer |
| 2002/0029279 | A1 | 3/2002 | Campbell et al. |
| 2002/0087894 | A1 | 7/2002 | Foley et al. |
| 2002/0156626 | A1 | 10/2002 | Hutchison |
| 2002/0174348 | A1 | 11/2002 | Ting |
| 2003/0014755 | A1 | 1/2003 | Williams |
| 2003/0031165 | A1 | 2/2003 | O'Brien, Jr. |
| 2003/0031184 | A1 | 2/2003 | Cunetto et al. |
| 2003/0074317 | A1 | 4/2003 | Hofi |
| 2003/0115475 | A1 | 6/2003 | Russo et al. |
| 2003/0149744 | A1 | 8/2003 | Bierre et al. |
| 2003/0163710 | A1 | 8/2003 | Ortiz et al. |
| 2003/0196084 | A1 | 10/2003 | Okereke et al. |
| 2003/0229805 | A1 | 12/2003 | Perry |
| 2003/0233542 | A1 | 12/2003 | Benaloh |
| 2004/0001575 | A1 | 1/2004 | Tang |
| 2004/0010697 | A1 | 1/2004 | White |
| 2004/0017898 | A1 | 1/2004 | Reynolds |
| 2004/0059923 | A1 | 3/2004 | ShamRao |
| 2004/0064334 | A1 | 4/2004 | Nye |
| 2004/0093211 | A1 | 5/2004 | Reynolds et al. |
| 2004/0107108 | A1 | 6/2004 | Rohwer |
| 2004/0117851 | A1 | 6/2004 | Karaoguz et al. |
| 2004/0172535 | A1 | 9/2004 | Jakobsson et al. |
| 2004/0264673 | A1 | 12/2004 | Novack |
| 2005/0055574 | A1 | 3/2005 | Chmaytelli |
| 2005/0071630 | A1 | 3/2005 | Thornton et al. |
| 2005/0147218 | A1 | 7/2005 | Novack et al. |
| 2005/0197118 | A1 * | 9/2005 | Mitchell ............... H04W 48/14 455/434 |
| 2005/0197188 | A1 | 9/2005 | Iizuka et al. |
| 2005/0210254 | A1 | 9/2005 | Gabryjelski et al. |
| 2006/0034287 | A1 | 2/2006 | Novack et al. |
| 2006/0036442 | A1 | 2/2006 | Novack et al. |
| 2006/0041507 | A1 | 2/2006 | Novack et al. |
| 2014/0223171 | A1 | 8/2014 | Novack et al. |

OTHER PUBLICATIONS

United States Patent and Trademark Office, "Office Action," issued in connection with U.S. Appl. No. 11/352,632, on Apr. 15, 2010, 31 pages.

United States Patent and Trademark Office, "Office Action," issued in connection with U.S. Appl. No. 11/352,632, on Dec. 13, 2012, 30 pages.

United States Patent and Trademark Office, "Office Action," issued in connection with U.S. Appl. No. 11/352,632, on May 28, 2013, 27 pages.

United States Patent and Trademark Office, "Notice of Allowance," issued in connection with U.S. Appl. No. 11/352,632, on Oct. 30, 2013, 12 pages.

United States Patent and Trademark Office, "Office Action," issued in connection with U.S. Appl. No. 14/244,876, on Jul. 15, 2014, 19 pages.

United States Patent and Trademark Office, "Notice of Allowance," issued in connection with U.S. Appl. No. 14/244,876, on Oct. 24, 2014, 10 pages.

* cited by examiner

METHODS AND APPARATUS TO CERTIFY DIGITAL SIGNATURES

RELATED APPLICATIONS

This patent arises from a continuation of U.S. patent application Ser. No. 14/244,876, filed on Apr. 3, 2014, entitled "METHODS AND APPARATUS TO CERTIFY DIGITAL SIGNATURES," which is a continuation of U.S. patent application Ser. No. 11/352,632, filed on Feb. 13, 2006, and granted as U.S. Pat. No. 8,700,902 on Apr. 15, 2014, entitled "METHODS AND APPARATUS TO CERTIFY DIGITAL SIGNATURES." U.S. patent application Ser. No. 14/244,876 and U.S. patent application Ser. No. 11/352,632 are hereby incorporated herein by reference in their entirety.

FIELD OF THE DISCLOSURE

The present disclosure relates generally to communication networks and, more particularly, to methods and apparatus to certify a digital signature.

BACKGROUND

Recently, increases in identity theft, corporate espionage, and other motives for data theft have created a need for more secure electronic communications. One method for securing communications is the use of digital signatures. A digital signature is a block of data that identifies the source of information. For example, a sender may attach a digital signature to an electronic mail message to indicate that the message was actually sent by the sender. The attached digital signature indicates that a third party did not send the message in the name of the sender. The digital signature can also be used by the recipient of the electronic message to verify that the message was not altered after it was sent by the sender. Digital signatures can be used to encrypt any type of data communications, such as webpages, file transfers, etc.

To obtain a digital signature, a user typically visits the webpage of a provider of digital signatures. The webpage causes software on the user's computer to generate a public and a private key for the digital signature. The public key and the private key are asymmetric pairs, which means that a message that is encrypted with one key can only be decrypted with the other key. The user can share the public key with anyone that is interested in sending a message to the user. The public key is used to encrypt the message before sending the message. When the user receives the encrypted message, the message is decrypted using the private key. The private key is the only key that can be used to decrypt the message. As a result, even if a third party intercepts the message, they cannot decrypt the message. In addition to encrypting the message using the user's public key, the message sender may additionally include their own digital signature to indicate that they are the actual sender.

Anyone with software for creating digital signatures can generate a digital signature indicating that they are any other person. Accordingly, the authenticity of a digital signature is typically certified by a digital signature certifier. VeriSign® is a popular certifier of digital signatures. When a user wishes to have their digital signature certified, they send a request to the digital signature certifier to certify the digital signature. The digital signature certifier often sends an electronic message to the email address specified in the digital signature. The user retrieves a code from the message and enters it on the digital signature certifier's webpage, proving that they are the user associated with the email address. The digital signature certifier then generates a certificate stating that the digital signature certifier vouches for the validity of the digital signature. When the digital signature is attached to a message, the certificate with the identity of the digital signature certifier is included. When the message is received by a recipient, the recipient can determine whether they trust the digital signature certifier.

As digital signatures are used more frequently and for more sensitive purposes (e.g., electronic banking), methods for verifying the authenticity of digital signatures will need to become more secure. While verifying that a user requesting a digital signature can receive an electronic mail message provides some security, a third party may be able to intercept messages to a user and, thus, could obtain a digital signature in the name of the user.

DETAILED DESCRIPTION

Figure 1:
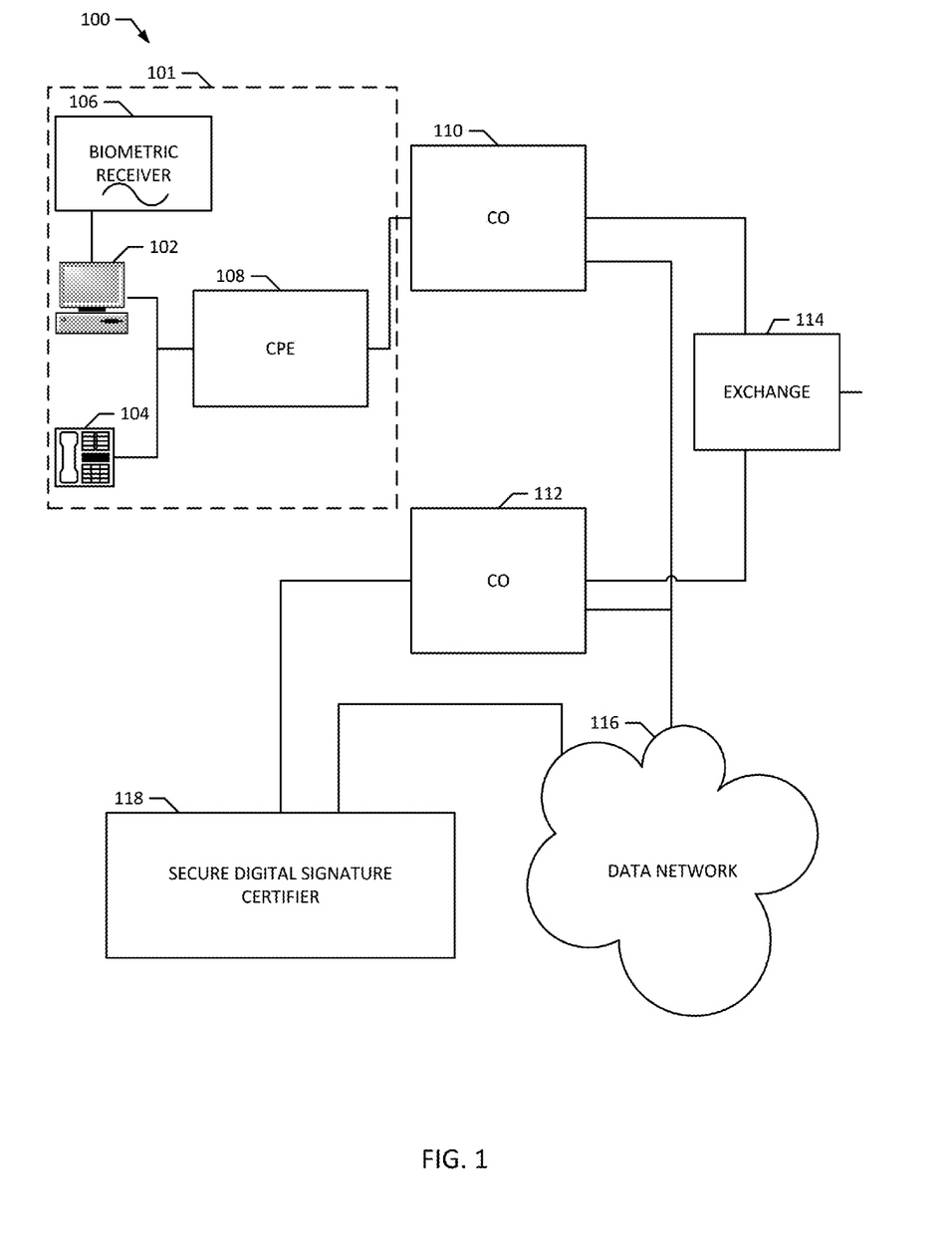
FIG. 1 is a block diagram of an example communications system to certify a digital signature.

An example communications system 100 is illustrated in FIG. 1. The example methods and apparatus described herein may be used to verify the identity of a user requesting certification of a digital signature prior to issuing such certification. In general, the proposed methods and apparatus verify that a physical characteristic (e.g., physical location and/or biometric information) of the user matches stored information prior to certifying a digital signature or requesting that a third party certify the digital signature. The stored information may be information that was collected at any time prior to the request for the digital signature. For example, the stored information may be collected when a user requests another service or a product (e.g., when a user requests telephone service, television service, internet service, etc).

The example communication system 100 includes a consumer location 101, a first central office (CO) 110, a second CO 112, an exchange 114, a data network 116, and a secure digital signature certifier 118.

The consumer location 101 comprises a computer 102, a telephone 104, a biometric receiver 106, and customer premise equipment (CPE) 108. The consumer location 101 may be any location from which a user may request certification of a digital signature. For example, the consumer location 101 may be a residence, a business, a library, a computer lab, etc.

The example computer 102 is connected to a data network for sending and receiving data communications. The example computer 102 is connected to the CPE 108 to gain access to data networks outside of the consumer location 101. A user uses the computer 102 to request the certification of a digital certificate. For example, the user may want a digital signature to use in encrypting communications and identifying the user. The user may visit a webpage on the internet to generate a digital signature. The webpage may request that the computer 102 generate a digital signature and send it to the secure digital signature certifier 118. The computer 102 may additionally send physical characteristic information about the user to the secure digital signature certifier 118 for verification. If the physical characteristic information can be verified, the computer 102 receives the certified digital certificate that can be used to identify the user and encrypt communications. Persons of ordinary skill in the art will recognize that the computer 102 may be any device having a microprocessor such as, for example, a desktop computer, a laptop computer, a handheld computer, a cellular phone, a digital video recorder (DVR), a personal video recorder (PVR), a television with a processor, an electronic mail terminal, etc. Additionally or alternatively, the computer 102 may be integrated in the CPE 108.

The telephone 104 may be a conventional telephone connected to a plain old telephone system (POTS) or a voice over internet protocol (VoIP) telephone connected to a data network. If the telephone 104 is a POTS telephone, it is connected to the CO 110. If the telephone 104 is a VoIP telephone, it is connected to the CPE 108 to gain access to data networks outside of the consumer location. The telephone 104 may be used to communicate with the secure digital signature certifier 118. For example, the telephone 104 may be used to transmit a user's voice to the secure digital signature certifier 118, which may use the user's voice to verify the identity of the user. Persons of ordinary skill in the art will recognize that the telephone 104 may be any device capable of transmitting and receiving voice communications.

The biometric receiver 106 may be any device capable of receiving biometric information. For example, the biometric receiver 106 may be a telephone receiver to receive voice biometric information, a microphone to receive voice biometric information, a fingerprint scanner, a facial characteristic recognizer, a retina scanner, a handprint scanner, a signature recognizer, etc. The biometric receiver 106 may not be necessary in all systems. For example, if the biometric receiver 106 is a telephone receiver, the biometric receiver 106 and the telephone 104 may be provided in the same device.

The CPE 108 is a device to enable data communication between the consumer location 101 and an external location. The example CPE 108 enables communication between the consumer location 101 and the central office 110. The CPE 108 may be one or more of a set top box (STB), a cable modem, a digital subscriber line (DSL) remote terminal unit, an asynchronous digital subscriber line (ADSL) terminal unit—remote (ATU-R), an IP television (IPTV) receiver, an analog modem, etc. Persons of ordinary skill in the art will recognize that the CPE 108 may comprise one or more of the previous devices and/or may be integrated in the computer 102.

The CO 110 is a location external to the consumer location 101 that is geographically near the consumer location 101. The CO 110 receives analog and digital communications from one or more consumer locations, which may be similar to consumer location 101. For example, the CO 110 may be a telecommunications central office that receives POTS communications and digital data communications from consumer locations. The CO 110 connects to the exchange 114 to enable communication with other CO's such as, for example, the CO 112. Persons of ordinary skill in the art will recognize that the CO 110 may not be necessary or may be replaced with a similar component depending on the type of communications network used.

The CO 112 is similar to the CO 110. The CO 112 receives analog and digital communications from the secure digital signature certifier 118 and connects to the exchange 114 to enable communication with other CO's such as, for example, the CO 110.

The exchange 114 receives analog and digital communications from CO's such as the CO 110 and the CO 112. The exchange 114 facilitates communication between CO's and communication with other exchanges. For example, if a user at the consumer location 101 uses the telephone 104 to make a phone call to a foreign country, the call is received by the CO 110 and transferred to the exchange 114, which transfers the call to an exchange in the foreign country.

The data network 116 enables communication between the consumer location 101 and the secure digital signature certifier 118. The data network 116 is illustrative of any data network that may be available in the example communications system 100. For example, the data network 116 may be a local area network, a wide area network, the internet, etc. The data network 116 may comprise multiple distinct networks that support intercommunication.

The secure digital signature certifier 118 receives requests to certify a digital signature, verifies the identity or location of the user generating the request, and certifies the digital signature. The secure digital signature certifier 118 may verify the identity of the user by receiving and validating biometric data. The secure digital signature certifier 118 may verify the location of the user by receiving identification information associated with network equipment and comparing the identification information to a database associating identification information with user locations. Methods and apparatus for implementing the secure digital certificate certifier 118 are described in further detail herein.

Figure 2:
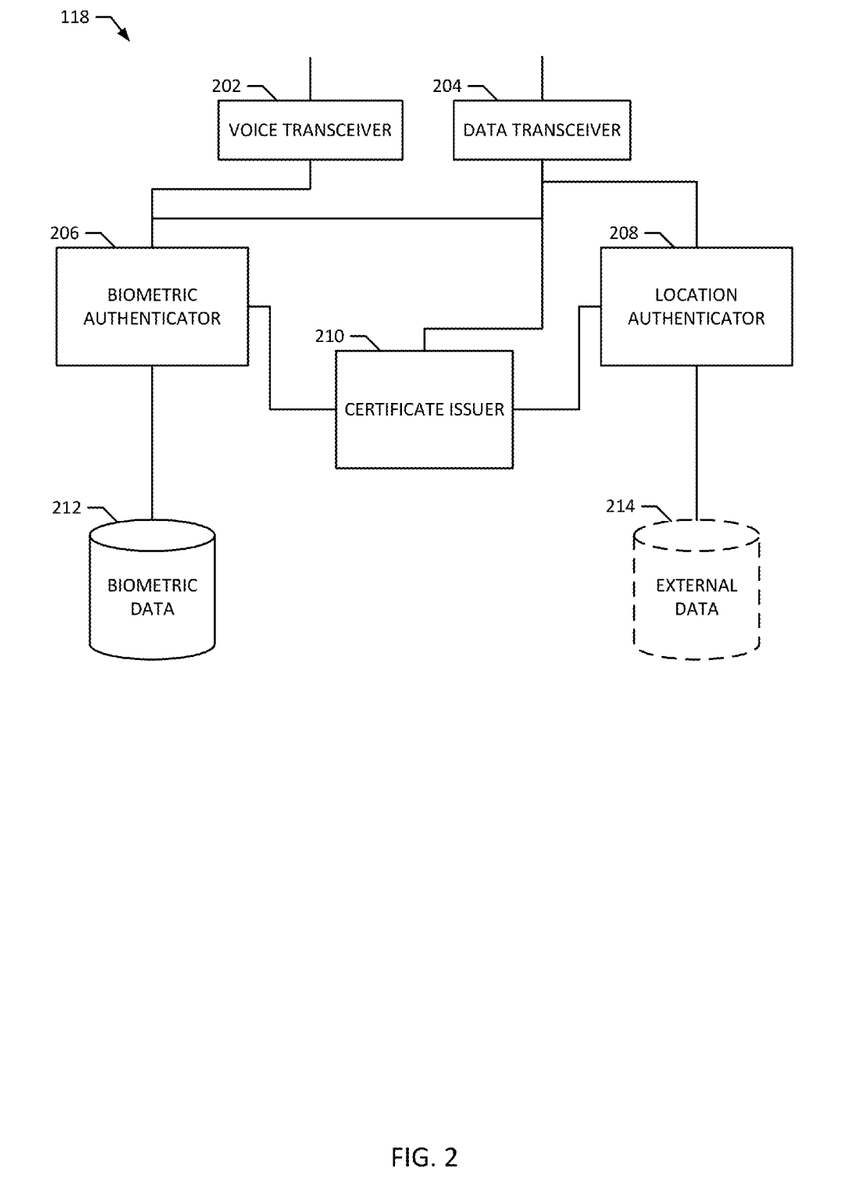
FIG. 2 is a block diagram of an example implementation of the secure digital signature certifier of FIG. 1.

FIG. 2 is a block diagram of an example implementation of the secure digital signature certifier 118 of FIG. 1. The example secure digital signature certifier 118 includes a voice transceiver 202, a data transceiver 204, a biometric authenticator 206, a location authenticator 208, a certificate issuer 210, a source of biometric data 212, and access to an external source of data 214. In general, the example secure digital signature certifier 118 receives requests to certify digital signatures. In response, the secure digital signature certifier 118 validates the request using the biometric authenticator 206 and/or the location authenticator 208. If the secure digital signature certifier 118 determines that the request is valid (e.g., that a user's biometric information matches stored information), the secure digital certifier 118 will certify the digital signature using the certificate issuer 210.

The voice transceiver 202 receives voice communications that are used for voice biometric authentication. The voice transceiver 202 may be connected to a telephone line, a data network, or any other system for transmitting voice communications. For example, a user may make a telephone call (e.g., via the telephone 104) to the secure digital signature certifier 118. The telephone call is received by the voice transceiver 202, which obtains a sample of the user's voice. The voice transceiver 202 may additionally use recorded voice prompts or utilize text-to-speech to communicate with a user. For example, the voice transceiver 202 may indicate a phrase that the user is to speak. Sampled voice communications are transmitted to the biometric authenticator 206.

The data transceiver 204 is capable of receiving data communications from a connected data communication source. The data transceiver 204 may communicate with multiple devices on a network (e.g., data network 116 of FIG. 1) or may communicate with only one device at a time.

The data transceiver 204 may connect to any available data communication source such as, for example, a private network, a public network, a wide area network, a local area network, a wireless network, dial-up network, etc.

The data transceiver 204 receives requests to certify digital signatures. In addition, the data transceiver 204 may receive identification information associated with a user (e.g., usernames, passwords, names, email addresses, birth dates, telephone numbers, network identifiers, circuit identifiers, or addresses etc.), biometric data, and/or data associated with a user's location (e.g., identification information associated with a user's network equipment). The data transceiver 204 transmits received data to one or more of the biometric authenticator 206, the location authenticator 208, and the certificate issuer 210.

The biometric authenticator 206 receives biometric identification information from the voice transceiver 202 and the data transceiver 204. The biometric authenticator 206 may receive information about a fingerprint, information about a voice, information about an eye, information about a handprint, information about facial features, information about a signature, information about a typing pattern, or information about a writing style, etc. The biometric authenticator 206 compares the received information associated with a user to biometric information stored in the biometric data 212 to determine if the received biometric information matches the stored biometric information associated with the user. The biometric authenticator 206 transmits a message to the certificate issuer 210 to indicate whether the received biometric information matches the stored biometric information. The biometric authenticator 206 may be any computer, server, or system capable of receiving biometric information and comparing the biometric information to stored biometric information. For example, the biometric authenticator 206 may be a voice recognition system from Nuance Communications, Inc.™.

The location authenticator 208 receives data associated with a user's location from the data transceiver 204. For example, the example location authenticator 208 receives identification information associated with network equipment (e.g., the CPE 108) at a user's location. For example, if the user accesses a computer network via a DSL modem, the location authenticator 208 may receive a serial number associated with the DSL modem and an address (e.g., a mailing address) entered by a user. The location authenticator 208 compares the received location information to information stored in the external data 214. The external data associates network equipment identification information with the address information. The location authenticator 208 receives the address information from the external data 214 and compares it to the address information entered by the user. Accordingly, the location authenticator 208 can determine if the address information entered by the user matches the address information associated with the location of the network equipment. The location authenticator 208 transmits a message to the certificate issuer 210 to indicate whether the user entered address information matches the address information associated with the network equipment.

The certificate issuer 210 receives a request to certify a digital signature from the data transceiver 204 and receives authentication messages from the biometric authenticator 206 and/or the location authenticator 208. If the authentication messages indicate that the biometric and/or location information matches stored information, the certificate issuer 210 issues a certificate to certify the digital signature. If the authentication messages indicate that the biometric and/or the location information does not match stored information, the certifier issuer 210 will not issue a certificate and may return an error to the user. The error may be sent to the user through the voice transceiver 202 and/or the data transceiver 204.

While FIG. 2 illustrates the certificate issuer 210 issues a certificate, it should be understood that the secure digital signature certifier 118 may operate as a registration authority and the certificate issuer 210 may request that another certificate issuer issue the certificate. Accordingly, the secure digital signature certifier 118 does not require the ability to issue a certificate. For example, the secure digital signature certifier 118 may validate the identity of the user requesting the digital signature. If the identity can be validated, the secure digital signature certifier 118 may send a message to the third-party certificate issuer indicating that the user has been validated. The third-party certificate issuer may be any entity capable certifying digital signatures. For example, the third-party certificate issuer may be VeriSign®, GeoTrust®, Microsoft®, etc.

The biometric data 212 is stored biometric identification information. The biometric data is obtained from users at some time prior to the user requesting a digital signature. For example, the biometric data may be obtained at the time that the user subscribes to a telecommunications service. Alternatively, the user may submit biometric information after verifying their identity. The biometric data 212 may be stored in a database, in a single file, in multiple files, etc. While the example biometric data 212 is illustrated as a part of the secure digital signature certifier 118, persons of ordinary skill in the art will recognize that the biometric data 212 may be stored outside of the secure digital signature certifier 118. For example, the biometric data 212 may be stored in database on a server dedicated to storing and indexing biometric data.

The external data 214 may be any data source associating location information with network equipment identification information. The external database 214 may be an accounting database, an equipment inventory database, a user database, etc. While the example external data 214 is external to the secure digital signature certifier 118, persons of ordinary skill in the art will recognize that the external data 214 may alternatively be a part of the secure digital signature certifier 118.

Figure 3:
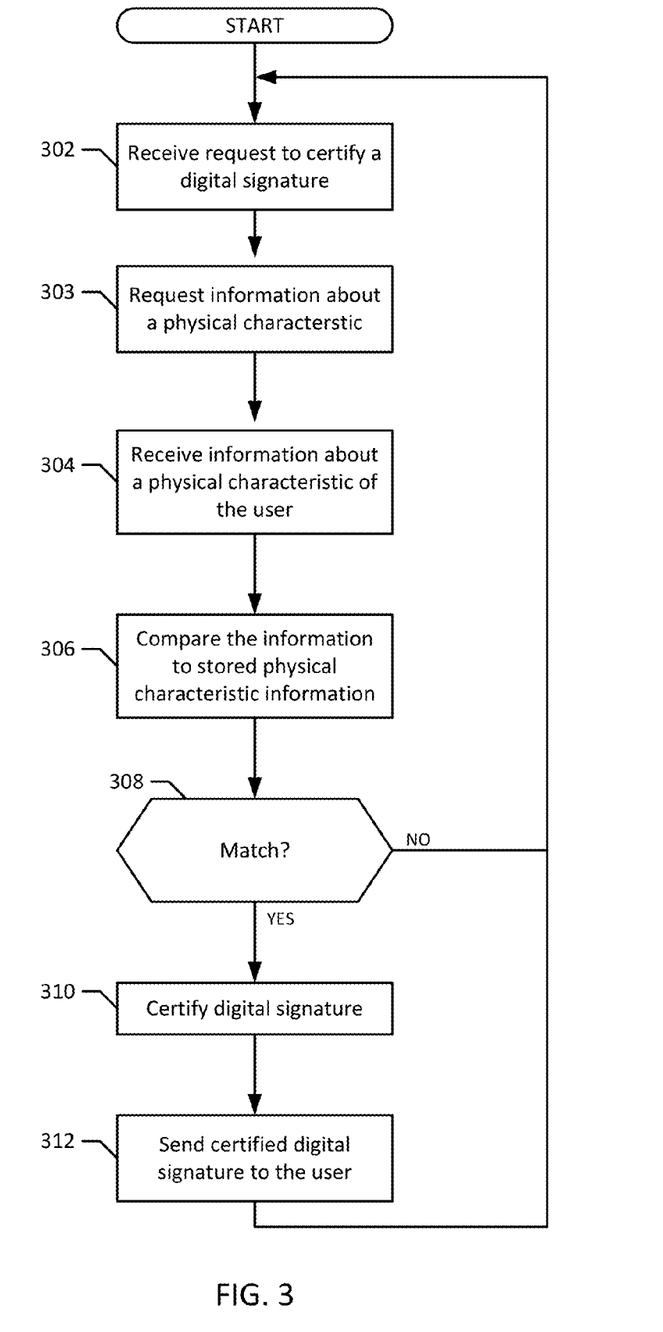
FIG. 3 is a flow diagram of an example process to certify a digital signature.
Figure 4:
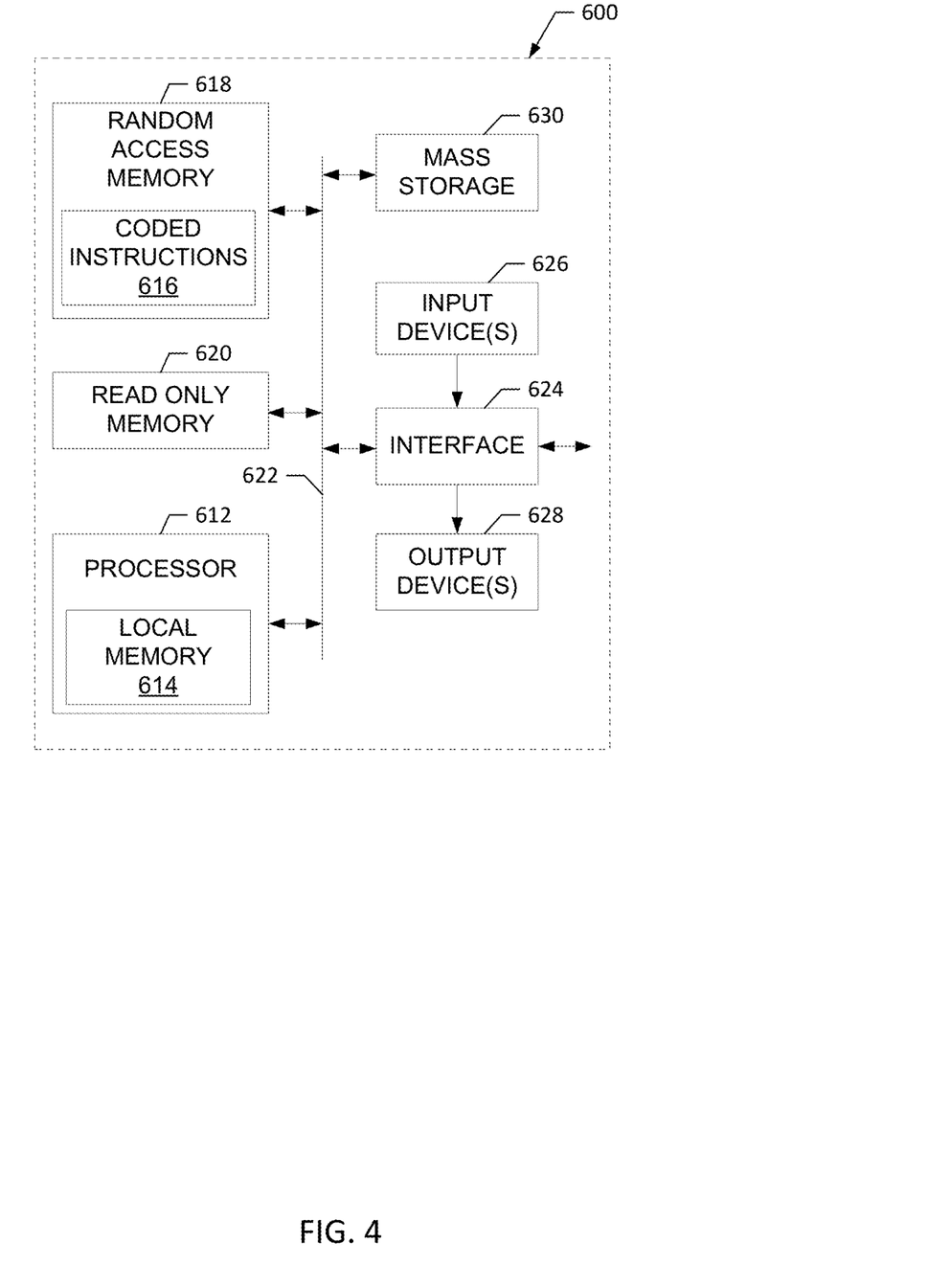
FIG. 4 is an example processor system that may be used to implement the example methods and apparatus described herein.

Flowcharts representative of example machine readable instructions or processes for implementing the apparatus 118 of FIGS. 1 and 2 are shown in FIGS. 3-5. In these examples, the machine readable instructions comprise a program for execution by a processor such as the processor 612 shown in the example computer 600 discussed below in connection with FIG. 4. The program may be embodied in software stored on a tangible medium such as a CD-ROM, a floppy disk, a hard drive, a digital versatile disk (DVD), or a memory associated with the processor 612, but persons of ordinary skill in the art will readily appreciate that the entire program and/or parts thereof could alternatively be executed by a device other than the processor 612 and/or embodied in firmware or dedicated hardware in a well-known manner. For example, any or all of the voice transceiver 202, the data transceiver 204, the biometric authenticator 206, the location authenticator 208, the certificate issuer 210, the biometric data 212, and/or the external data 214 could be implemented using any combination of software, hardware, and/or firmware. Further, although the example programs are described with reference to the flowcharts illustrated in FIGS. 3-5, persons of ordinary skill in the art will readily appreciate that many other methods of implementing the example apparatus 118 may alternatively be used. For example, the order of execution of the blocks may be changed, and/or some of the blocks described may be changed, eliminated, or combined.

The example process of FIG. 3 begins when the data transceiver 204 of the secure digital signature certifier 118 receives a request to certify a digital signature (block 302). The voice transceiver 202 and/or the data transceiver 204 then sends a request for information about a physical characteristic about the user submitting the request to certify a digital signature (block 303). The voice transceiver 202 and/or the data transceiver 204 of the secure digital signature certifier 118 then receives information about a physical characteristic associated with the user (block 304). The physical characteristic may be biometric information associated with the user, information associated with the user's network equipment, information associated with the user's geographic location, etc. In addition, the information may include a username, a password, a name, a telephone number, a network identifier, a circuit identifier, an address, a birth date, an email address, etc.

The secure digital signature certifier 118 then compares the received information with stored physical characteristic information (block 306). The secure digital signature certifier 118 may compare the physical characteristic information received at block 304 to information stored when the user signed up for other services provided by the entity that is employing the secure digital signature certifier 118. For example, if the received physical characteristic information is information associated with a user's voice, the biometric authenticator 206 may compare the received information with voice information that was stored when the user applied for another service provided by the entity employing the secure digital signature certifier 118. In another example, if the location authenticator 208 receives an address entered by a user and network device identification information, the location authenticator 208 can retrieve from the external data 214 the address where the network device associated with the network device identification information was installed. The location authenticator 208 can then compare the retrieved address to the address that was entered by the user.

The secure digital signature certifier 118 determines if the received physical characteristic information matches the stored physical characteristic information (e.g., is identical to the stored physical characteristic information, is substantially similar to the stored physical characteristic information, is associated with the stored physical characteristic information, etc.) (block 308). Then, based on the comparison, the certificate issuer 210 certifies the digital signature (block 310).

For example, if the received information does not match the stored information, control returns to block 302 to wait for another request. Additionally, an error may be transmitted using the voice transceiver 202 and/or the data transceiver 204 to indicate that the secure digital signature certifier 118 could not validate the identity of the user and has not certified the digital signature. If the received physical characteristic information matches the stored physical characteristic information, the certificate issuer 210 certifies the digital signature (block 310). The certificate issuer 210 may additionally store information associated with the digital signature to enable the secure digital signature certifier 118 to maintain a record that the digital signature has been certified. The data transceiver 204 of the secure digital signature certifier 118 then sends the certificate and/or the digital signature to the user (block 312). Control then returns to block 302 to wait for another request.

FIG. 4 is a block diagram of an example computer 600 capable of executing the machine readable instructions illustrated in FIG. 3 to implement the apparatus and/or methods disclosed herein. The computer 600 can be, for example, a server, a personal computer, a personal digital assistant (PDA), an Internet appliance, a set top box, or any other type of computing device.

The system 600 of the instant example includes a processor 612 such as a general purpose programmable processor. The processor 612 includes a local memory 614, and executes coded instructions 616 present in the local memory 614 and/or in another memory device. The processor 612 may execute, among other things, the machine readable instructions illustrated in FIG. 3. The processor 612 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 612 is in communication with a main memory including a volatile memory 618 and a non-volatile memory 620 via a bus 622. The volatile memory 618 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory 618, 620 is typically controlled by a memory controller (not shown) in a conventional manner.

The computer 600 also includes a conventional interface circuit 624. The interface circuit 624 may be implemented by any type of well known interface standard, such as an Ethernet interface, a universal serial bus (USB), and/or a third generation input/output (3GIO) interface.

One or more input devices 626 are connected to the interface circuit 624. The input device(s) 626 permit a user to enter data and commands into the processor 612. The input device(s) can be implemented by, for example, a keyboard, a mouse, a touchscreen, a track-pad, a trackball, isopoint and/or a voice recognition system.

One or more output devices 628 are also connected to the interface circuit 624. The output devices 628 can be implemented, for example, by display devices (e.g., a liquid crystal display, a cathode ray tube display (CRT), a printer and/or speakers). The interface circuit 624, thus, typically includes a graphics driver card.

The interface circuit 624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 600 also includes one or more mass storage devices 630 for storing software and data. Examples of such mass storage devices 630 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

This patent contemplates examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to process digital signature certification requests, the method comprising:
   retrieving, from a first database, a first geographical location associated with an identification number associated with a network device and identified in a request to certify a digital signature;
   comparing the first geographical location associated with the identification number to a second geographical location to verify the second geographical location; and
   in response to the verification of the second geographical location and to a comparison of (a) biometric information associated with a user associated with the request and (b) stored biometric information, instructing a certificate issuer to certify the digital signature to indicate an authenticity of the digital signature.

2. The method as defined in claim 1, further comprising supplying a service other than digital signature certification when the digital signature is certified as authentic.

3. The method as defined in claim 2, further comprising obtaining the biometric information associated with the user when the user requests the service other than the digital signature certification.

4. The method as defined in claim 1, further comprising requesting the identification number associated with the network device.

5. The method as defined in claim 1, wherein the first database is at least one of an accounting database, an equipment inventory database, or a customer records database.

6. The method as defined in claim 1, wherein the first database is associated with at least one of a telephone service provider, an internet access provider, a cable television service provider, a satellite television service provider, a credit card service provider, or a bank.

7. The method as defined in claim 1, wherein the biometric information of the user is at least one of information about a fingerprint, information about a voice, information about an eye, information about a handprint, information about facial features, information about a signature, information about a typing pattern, or information about a writing style.

8. The method of claim 1, wherein the digital signature is certified at a location different than a location of the user.

9. A tangible machine readable storage device comprising instructions which, when executed, cause a machine to perform operations comprising:
   retrieving, from a first database, a first geographical location associated with an identification number associated with a network device and identified in a request to certify a digital signature;
   comparing the first geographical location associated with the identification number to a second geographical location to verify the second geographical location; and
   in response to the verification of the second geographical location and to a comparison of biometric information associated with a user associated with the request to stored biometric information, instruct a certificate issuer to certify the digital signature to indicate an authenticity of the digital signature.

10. The tangible machine readable storage device as defined in claim 9, wherein the operations further comprises supplying a service other than digital signature certification.

11. The tangible machine readable storage device as defined in claim 10, wherein the operations further comprises obtaining the biometric information associated with the user when the user requests the service other than the digital signature certification.

12. The tangible machine readable storage device as defined in claim 9, wherein the operations further comprises requesting the identification number associated with the network device.

13. The tangible machine readable storage device as defined in claim 9, wherein the first database is at least one of an accounting database, an equipment inventory database, or a customer records database.

14. The tangible machine readable storage device as defined in claim 9, wherein the first database is associated with at least one of a telephone service provider, an internet access provider, a cable television service provider, a satellite television service provider, a credit card service provider, or a bank.

15. The tangible machine readable storage device as defined in claim 9, wherein the biometric information of the user is at least one of information about a fingerprint, information about a voice, information about an eye, information about a handprint, information about facial features, information about a signature, information about a typing pattern, or information about a writing style.

16. The tangible machine readable storage device as defined in claim 9, wherein the digital signature is certified at a location different than a location of the user.

17. An apparatus comprising;
a processor; and
a memory including machine readable instructions that, when executed by the processor, cause the processor to perform operations comprising:
   receiving a request to certify a digital signature from a user and to receive first information about a first physical characteristic of the user;
   verifying a second geographical location identified in the request by retrieving a first geographical location associated with an identification number identified in the request and associated with a network device from a first database, and comparing the first geographical location associated with the identification number to the second geographical location to verify the second geographical location; and
   in response to a comparison of first information about the first physical characteristic of the user to first stored physical characteristic information and the verification of the second geographical location, instruct a certificate issuer to certify the digital signature to indicate an authenticity of the digital signature.

18. The apparatus as defined in claim 17, wherein the first stored physical characteristic information is stored in a database that is external to the apparatus.

19. The apparatus as defined in claim 18, wherein the first database is associated with at least one of a telephone service provider, an internet access provider, a cable television service provider, a satellite television service provider, a credit card service provider, or a bank.

20. The apparatus as defined in claim 17, wherein the instructions, when executed, cause the processor to perform operations comprising requesting the identification number associated with the network device.

21. The apparatus as defined in claim 17, wherein the first database is at least one of an accounting database, an equipment inventory database, or a customer records database.

22. The apparatus as defined in claim 17, wherein the first geographical location is stored in a database associated with at least one of a telephone service provider, an internet access provider, a cable television service provider, a satellite television service provider, a credit card service provider, or a bank.

23. The apparatus as defined in claim 17, wherein the first information about the first physical characteristic is biometric information.

24. The apparatus as defined in claim 23, wherein the biometric information is at least one of information about a fingerprint, information about a voice, information about an eye, information about a handprint, information about facial features, information about a signature, information about a typing pattern, or information about a writing style.

* * * * *